Jan. 14, 1941.   R. G. LE TOURNEAU   2,228,770
SHAFT AND HUB MOUNTING
Filed Aug. 19, 1938

INVENTOR
R. G. LeTourneau
BY
ATTORNEY

Patented Jan. 14, 1941

2,228,770

UNITED STATES PATENT OFFICE 2,228,770

SHAFT AND HUB MOUNTING

Robert G. Le Tourneau, Peoria, Ill., assignor to R. G. Le Tourneau, Inc., a corporation of California Application August 19, 1938, Serial No. 225,743

1 Claim. (Cl. 287—53)

This invention relates in general to an improved shaft and hub mounting; and in particular the invention is directed to a shaft and hub mounting including a straight spline, and shaft taper in novel combination.

Heretofore various arrangements have been devised for fixing a shaft and hub in rigid driving relation. Early in the art the hub and axle had a straight fit, the hub being pressed on the axle with a key therebetween. Subsequently the now commonly used mounting was developed, which includes a taper fit with a keyway cut in the tapered portions of the shaft and hub and parallel to said taper. There have, however, been certain objections to these known arrangements. For example, the necessity of fitting and placing the separate key causes much trouble, particularly where multiple keyways and keys are used. Also, where the straight axle was press fitted into the hub, or where a tapered shaft was drawn into the hub, the key often locked the shaft and hub against easy separation.

Some attempts have been made to secure the hub and shaft in rigid connection by use of a spline but it has been determined, however, that if the spline is fitted closely enough not to work loose it is then difficult to separate the shaft and hub.

The principal object of the present invention is to provide a novel shaft and hub mounting which includes, in combination, a taper fit between the shaft and hub whereby to maintain the hub in proper and close fitting alinement on the shaft, and a straight spline to provide the driving connection between said shaft and hub and to prevent relative rotation therebetween.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
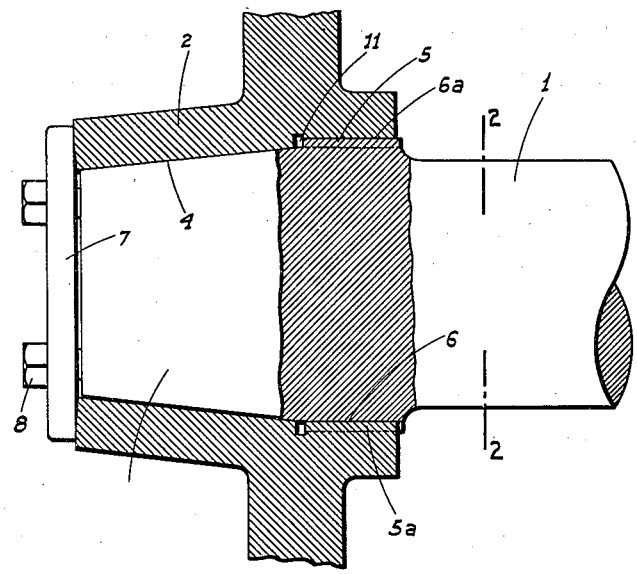
Figure 1 is a sectional elevation of one form of my improved shaft and hub mounting.
Figure 2:
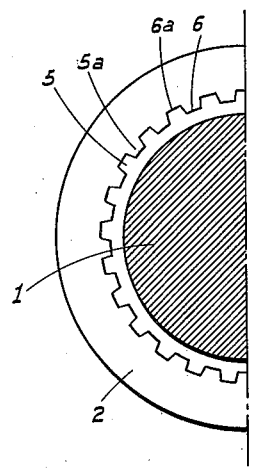
Figure 2 is a half section on line 2—2 of Fig. 1.

Referring now more particularly to the characters of reference on the drawing, and particularly at present to the embodiment of the invention shown in Figs. 1 and 2, the numeral 1 indicates the shaft on which an engaged hub 2 is mounted as follows:

The shaft extends through a bore in the hub as usual, and the outer end portion 3 of the shaft is fitted into the hub 2 on a taper as shown at 4. The hub engaging portion of the shaft ahead of the taper and the corresponding portion of the hub are cut straight and splined. This spline comprises straight longitudinal ribs or keys 5, which are disposed entirely outside the circumferential surface of the shaft, and parallel grooves 6 formed therebetween. The ribs 5 and grooves 6 cooperate with corresponding ribs 5a and grooves 6a formed in the hub, these parts engaging with a close but easy sliding fit. This arrangement enables the splining to be cut on an ordinary hobbing machine in a very short time.

The shaft is drawn into frictional engagement in the hub and to the desired extent by any suitable means such as an end plate 7 which engages the outer end of the hub and through which plate bolts 8 extend to threaded engagement in the adjacent shaft end.

As the taper fit is employed as the alining and hub supporting surface only, the taper need not be drawn into excessive frictional engagement as is necessary in the common taper and key arrangement; and as the taper fit alines and supports the hub, the spline need only be a reasonably close and not excessively tight fit in order to properly drive the hub. With this arrangement, the shaft and hub are held in rigid relatively non-rotatable connection and yet may be readily and easily separated if desired.

Figure 3:
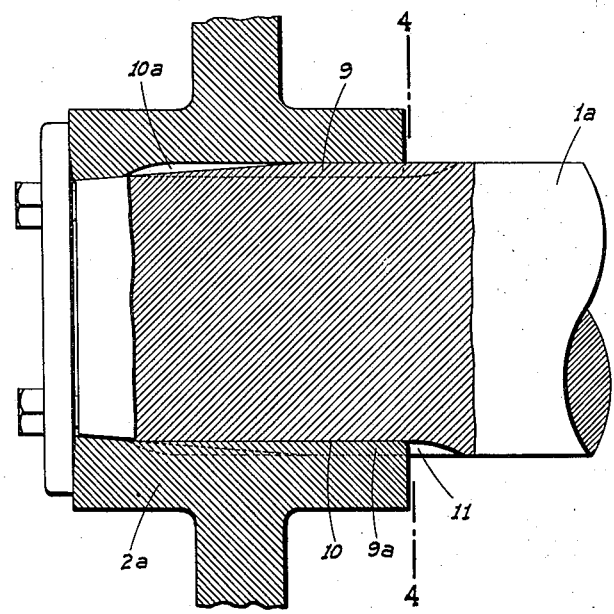
Figure 3 is a sectional elevation of another form of the invention.
Figure 4:
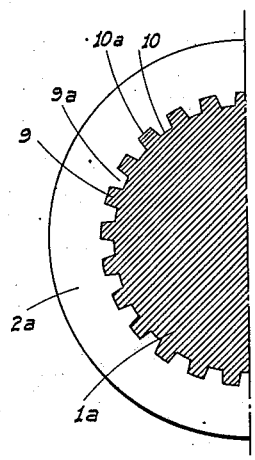
Figure 4 is a half section on line 4—4 of Fig. 3.

The other form of the invention as shown in Figs. 3 and 4 embodies the same combination of taper and straight spline above described but in a slightly varied arrangement. In this form of the invention the spline ribs asnd grooves 9 and 10 are cut entirely within the circumferential surface of the shaft 1a and the hub 2a is cut with corresponding ribs and grooves 9a and 10a respectively to fit with the shaft portions of the spline; this straight spline feathering out from the shaft intermediate the ends of the taper portion 4a. In use, this form of the invention functions in the same manner and provides the same advantages as previously described in connection with the form illustrated in Figs. 1 and 2.

It is to be noted that in both forms of the invention the adjacent ends of the spline keys and keyways are spaced apart in the final assembly as at 11 so as to allow the tapered portion of the shaft and hub to be drawn closely together to a proper fit without in any way interfering with the spline driving connection.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a shaft and hub mounting, a shaft having a frusto-conical portion at the end thereof, a cylindrical portion on the shaft extending from the large end of said frusto-conical portion, said cylindrical portion being of substantially greater diameter than the greatest diameter of the frusto-conical portion and having longitudinal grooves therein to form straight splines, the depth of said grooves being no greater than the difference between the greatest diameter of said frusto-conical portion and the outside diameter of said cylindrical shaft portion, and a hub having a tapered bore to wedgingly receive the frusto-conical shaft portion and a cylindrical bore formed with straight spline grooves complementary to the straight splines formed from the enlarged cylindrical portion of the shaft.

ROBERT G. LE TOURNEAU.